April 22, 1930.   J. B. HENDRICKSON   1,755,321
WELDING HYDRAULIC APPARATUS

Filed April 2, 1926

Inventor
John B. Hendrickson
By his Attorneys
Edwards, Sager and Bower

Patented Apr. 22, 1930

1,755,321

UNITED STATES PATENT OFFICE

JOHN B. HENDRICKSON, OF PHILADELPHIA, PENNSYLVANIA, ASSIGNOR TO WELDING ENGINEERS INCORPORATED, A CORPORATION OF DELAWARE

WELDING HYDRAULIC APPARATUS

Application filed April 2, 1926. Serial No. 99,356.

This invention relates to hydraulic machines and a method for forming and protecting the same against corrosion in service.

It is an object of my invention to provide hydraulic machines with fluid flow surfaces formed so as to reduce corrosion (sometimes called pitting) or wear to a minimum.

A further object is to provide an improved method for building up a turbine runner blade and for providing an improved structure and method for preventing corrosion at joints in fluid ways, especially joints associated with hydraulic turbines.

Other objects will appear from the following description of the accompanying drawing, in which Fig. 1 is a fragmentary elevation partly in section of a turbine runner and housing;

Figure 1:
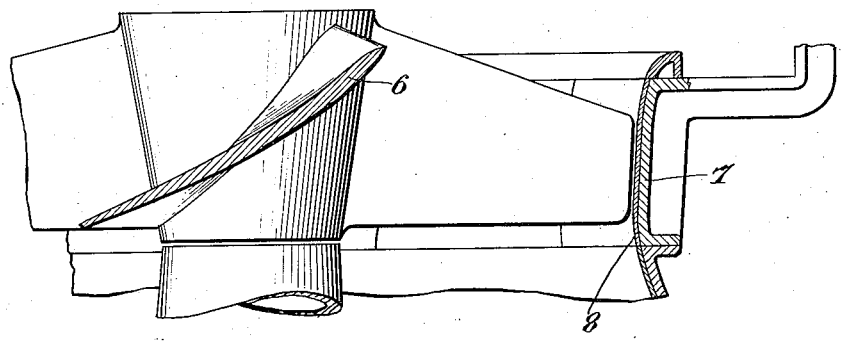
Figure 2:
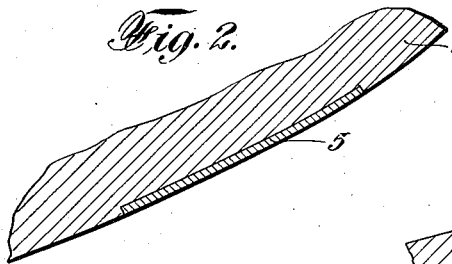
Fig. 2 is a fragmentary sectional view of a turbine runner showing a protecting coating on one surface thereof.
Figure 3:
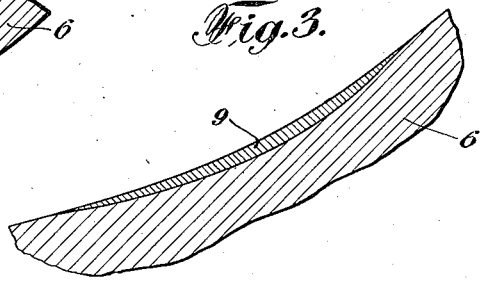
Fig. 3 is a fragmentary sectional view of a turbine runner showing material added thereto.

Certain parts of hydraulic apparatus are corroded and worn by fluid flow. The corrosion is often due to imperfect or porous fluid flow surfaces of such parts of hydraulic machines as runner blades, runner housings and the surfaces adjacent a housing joint, especially at edge or surface subjected to high velocity, as in hydraulic turbines or the like. On the other hand, the surfaces may be initially substantially perfect but will wear due to usual conditions existing in hydraulic work. In some cases this wear may not be uniform and accordingly as time goes on corrosion or wear may occur, and due to the imperfect surfaces formed the rate of corrosion or wear may be abnormally increased. Corrosion is augmented by high velocities and low pressure areas, as before mentioned, which conditions are peculiarly associated with hydraulic machines.

In order to prevent corrosion to as great an extent as possible in connection with hydraulic runners, impellers of centrifugal pumps, ship propellers or the like I propose in one aspect of the invention to weld a layer of protective metal 5 on the blade body 6 during its manufacture, or to weld a layer of such protective metal over certain specific parts of the runner surface which are most subject to corrosion. This operation is performed prior to placing the hydraulic apparatus in use.

The protective metal is deposited preferably by electric welding, and this metal due both to the nature of the metal used and the type of welding employed causes the metal to have greater resistance to corrosion than the metal forming the body of the runner blades or other apparatus. It is sometimes desirable to employ certain alloys, although other particular combinations of metals might be employed to advantage. It will thus be seen that by my method initial corrosion cannot set in, thereby eliminating the necessity of shutting down the turbine or other apparatus in order to repair the same, which would be the case if the protective layer was not initially employed. From experience the particular areas of hydraulic apparatus which are subject to corrosion are determinable and accordingly if desired, in order to reduce the expense these particular areas only my be covered with the protective layer.

This latter feature of localizing the welding material may be carried still further so as to form, or determine what is the desired shape of a runner blade. It is recognized that water flow through a turbine is complex and it is a difficult matter, particularly for high speed turbines, to design a runner which will meet all of the flow conditions from low to full load without corrosion developing as a result of the runner design being out of harmony with the actual flow conditions. The life of the runner is, therefore, dependent upon the design of the vanes. This lack of harmony has been apparent in certain hydraulic apparatus, which has been in use, due to the development of corrosion on certain portions of the blade surfaces. In my improved method I utilize this condition as one step to obtain a more perfect surface which shall harmonize more closely with the actual flow conditions. To correct the blade surface the areas chiefly subject to corrosion will have deposited thereon welding material 9 to such an extent that a surface will be had having a contour different than the original cast surface.

This feature of welding in specific areas or over the entire area may be extended to those cases where during casting of the runners inequalities of foundry practice result in the blade surfaces being warped out of the true position. Such inequalities would cause corrosion, but by my improved method the blade surface shape could be formed so as to harmonize with flow conditions.

Thus, it will be seen that in all forms of the invention the idea prevails of preventing corrosion in hydraulic machines by a protective coating of welded material, with the further feature of utilizing welding material to obtain a more perfect contour of the surfaces involved, and to make the same conform to the actual flow conditions.

In Fig. 1 is shown a turbine having runners as 6 and provided with a casing or housing 7 lined at 8, thus illustrating one example of an apparatus embodying the invention.

I claim:

1. In a hydraulic machine, a cast member having a fluid surface of predetermined contour, said cast member comprising a body portion provided with a recessed portion within a predetermined area, and a layer of welding material deposited by welding in said recessed portion of said body portion at said area to form a portion of said fluid surface and surfaced to give the desired predetermined contour, thereby providing an integral homogeneous structure including a cast support and a layer of welded material thereon as a compact tough surfacing resistant to corrosion.

2. The method of forming an integral continuous fluid surface on a cast portion of a hydraulic machine consisting of forming a layer of welding material by depositing said material by welding it directly on the parts of the cast portion which are subject to corrosion and pitting and smoothing the surface of said welding material so that a single integral and continuous surface will be provided permitting smooth flow lines and to prevent pitting and corrosion at the welded parts.

3. In a hydraulic machine, a cast member having a fluid surface of predetermined contour, said cast member comprising a body portion having formed in it a recessed portion of predetermined area and substantially uniform depth, and a layer of welding material of substantially uniform thickness deposited by welding in said recessed portion, the outer face of the welded layer being surfaced to give the desired predetermined contour and forming a portion of the fluid surface of the cast member, thereby providing an integral structure including the cast support and a layer of welded material thereon as a compact tough surfacing resistant to corrosion.

JOHN B. HENDRICKSON.